United States Patent [19]
Reilly et al.

[11] Patent Number: 4,635,269
[45] Date of Patent: Jan. 6, 1987

[54] FLOWING GAS LASER HAVING SCREENING FOR SMOOTHING LOW TURBULENCE FLOW

[75] Inventors: James P. Reilly, Lexington; M. John Yoder, Andover, both of Mass.

[73] Assignee: Laser Corporation of America, Wakefield, Mass.

[21] Appl. No.: 699,672

[22] Filed: Feb. 8, 1985

[51] Int. Cl.[4] .............................................. H01S 3/22
[52] U.S. Cl. ......................................... 372/58; 372/85
[58] Field of Search ..................... 372/85, 58, 61, 55, 372/92, 65, 98

[56] References Cited

U.S. PATENT DOCUMENTS

| | | | |
|---|---|---|---|
| 3,798,486 | 3/1974 | Hernqvist | 372/56 |
| 4,096,449 | 6/1978 | Foster | 372/85 |
| 4,344,174 | 8/1982 | Spaldong et al. | 372/55 |
| 4,457,000 | 6/1984 | Rao | 372/58 |

FOREIGN PATENT DOCUMENTS 0162380 10/1982 Japan ................................ 372/55

OTHER PUBLICATIONS

Artamonov et al; "Investigation of an Electric Discharge Chamber of a Fast Flow CO2 Laser"; *Sov. Jour. Quant. Electron.*, vol. 7, No. 3, Mar. 1977.

Hernqvist; "He-Cd Lasers Using Recirculation Geometry", IEEE JQE, Sep. 1972, p. 740.

*Primary Examiner*—Leon Scott, Jr.
*Attorney, Agent, or Firm*—Louis Orenbuch

[57] ABSTRACT

A flowing gas laser of the kind normally operating in the glow discharge mode and having a glow discharge region through which the gas flows while the glow discharge occurs, employs one or an array of flow smoothing screens disposed in series in the gas flow path in a manner that enables the input power loading to be increased without causing arcing in the electric discharge of the lasing gas. The screens are disposed upstream of the glow discharge region and cause smoothing of small scale turbulence in the gas flow. The screen closest to the discharge region is spaced from the beginning of that region by a distance not less than ten times the distance between adjacent holes of the screen. Successive screens in the series array are spaced at intervals sufficient to enable the requisite flow smoothing by each screen to occur before the flow encounters the next screen of the array.

4 Claims, 5 Drawing Figures

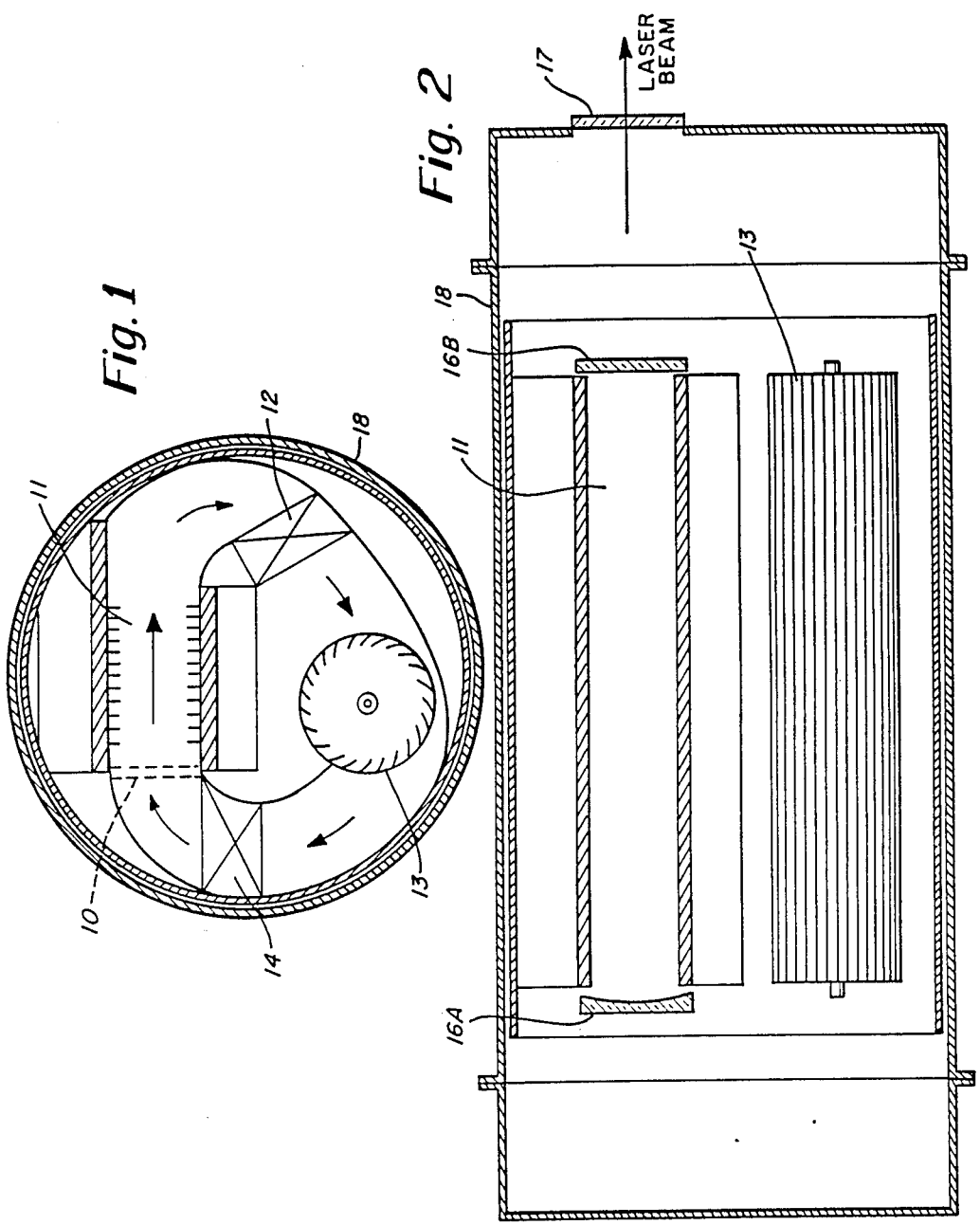

DAMPING OF VELOCITY NONUNIFORMITIES BY A SCREEN
HAVING PRESSURE DROP COEFFICIENT $K = \Delta P/(1/2)\rho U^2$.

ALLOWABLE REGIMES FOR TURBULENT DAMPING BY SCREENS.

DECAY OF ENERGY DURING AND BEYOND THE INITIAL PERIOD (AFTER BATCHELOR AND TOWNSEND, 1948 a).

FLOWING GAS LASER HAVING SCREENING FOR SMOOTHING LOW TURBULENCE FLOW

FIELD OF INVENTION

This invention relates in general to gas lasers of the type utilizing a flowing gas as the lasing medium. More particularly, the invention pertains to an improvement that enables greater input power loading to be attained without causing arcing in the electric glow discharge of the gas lasing medium.

BACKGROUND OF THE INVENTION

The flowing gas laser employing a gas such as $CO_2$ or a mixture of gases, such as $CO_2$, He, CO, $H_2$ and $N_2$, as the lasing medium is capable of continuously generating high power, e.g., power of 200 watts and above. A major problem in obtaining high power output from that type of laser is the tendency of the electric discharge in the lasing medium to arc. A high power electric glow discharge in the high velocity gas flowing through the lasing region is difficult to maintain because of instabilities that adversely affect the electric discharge. Those instabilities cause or contribute to the breakdown of the diffuse uniform glow discharge that occurs in the proper operation of the laser into arcs. Arcing severely reduces lasing efficiency and causes a breakdown of the lasing medium so that the conditions for the proper electric field current density and gain uniformity are not achieved. Arcing can also harm the laser by damaging the electrodes and other structures in the region of the arc. The propensity of the lasing medium to arc increases as the input power loading is increased, and the instabilities accompanying the dynamics of gas flow at high velocities can contribute to the tendency of the electric discharge in the lasing medium to change from the glow mode into the unwanted arc mode.

The "prior art" technical literature pertaining to high power, flowing gas lasers specifically discloses arrangements for the deliberate introduction of turbulence in the gas flow for the purpose of "smoothing" or "spreading" the current to prevent arcing in the electric discharge of the gas lasing medium. See, for example, the monograph titled "Closed-Cylce Performance Of A High-Power Electric Discharge Laser" by Brown and Davis in Appl. Phys. Lett., Vol. 21, No. 10, Nov. 15, 1972, and U.S. Pat. Nos. 3,772,610 and 4,016,448.

The large scale, high intensity turbulence utilized in "prior art" high power, flowing gas lasers, while effectively enabling greater input power loading without arcing in the electric glow discharge, tends to degrade other desirable properties of the gas flow. Large scale, high intensity turbulence, for example, tends to degrade homogeneity of the gas, and distort the acoustic spectrum. In addition to other undesired effects, that turbulence interferes with the isolation of the gas from contact with the channel walls provided by what otherwise would be undisturbed wall boundary layers and that turbulence can degrade the ability to recover a sizable fraction of the gas flow field's dynamic pressure. Also, the introduction of turbulence into the gas flow generally requires a pressure drop in the flow loop which must be compensated for by the use of larger or more powerful blowers.

THE INVENTION

This invention runs counter to the conventional practice of using large scale turbulence in the gas flow of a gas laser to stabilize the electric glow discharge in the gas. In contrast to conventional practice, the invention relates to low turbulence gas flow and in particular pertains to the employment of flow-smoothing screens in the gas flow path in a manner that enables the input power loading to be increased without causing arcing in the electric discharge of the lasing gas. The invention arises from the discovery that small scale turbulence in an otherwise smooth gas flow appreciably reduces the amount of input power that can be applied before arcing occurs in the electric discharge of the lasing gas.

OBJECTS OF THE INVENTION

The principal object of the invention is to provide flow-smoothing screens in the gas flow path of a gas laser to eliminate or reduce small scale turbulence in the flowing gas whereby the laser's ability to operate at higher power in the arcless glow discharge mode is extended.

Another object of the invention is to provide flow-smoothing screens in the gas flow path of a gas laser in a manner that promotes the conditions required for an arcless glow discharge while simultaneously providing a substantially optically uniform gas flow field over the volume in which the glow discharge occurs and while not degrading other desirable gas flow properties.

Another object of the invention is to provide flow-smoothing screens in the flow path of a flowing gas laser that cause flow field density and velocity inhomogeneities to be brought to the levels required for the operation in an arcless glow discharge mode of a gas laser of the transverse flowing gas type.

THE DRAWINGS

FIG. 1 is a cross-sectional view which schematically depicts the invention embodied in a flowing gas laser of the transverse gas flow type having a closed loop gas flow system.

FIG. 2 is a longitudinal cross-sectional view schematically showing the interior arrangement of the FIG. 1 embodiment.

DETAILED DESCRIPTION OF THE INVENTION

Figure 3:
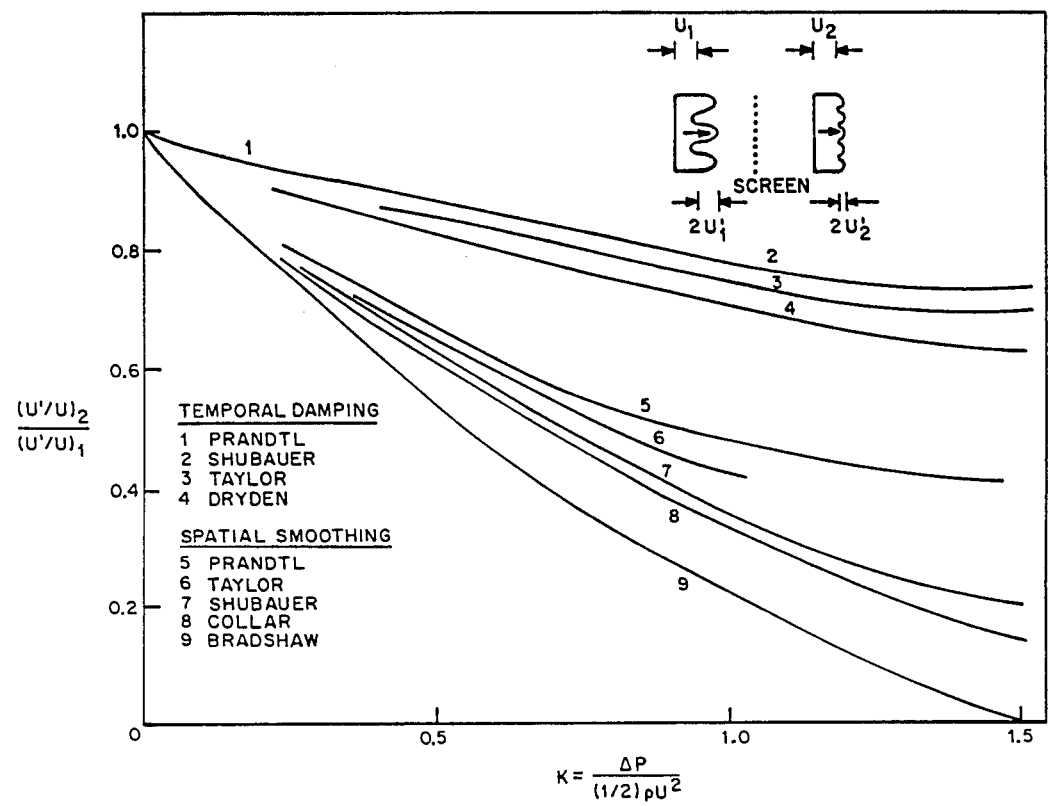
FIG. 3 is a graph showing the temporal damping and spatial smoothing effects of a screen disposed in the gas flow path.

Referring now to FIG. 1 of the drawings, the invention is shown embodied in a flowing gas laser of the transverse gas flow type having a closed loop gas flow system. In that figure, the closed loop gas flow path is indicated by a series of arrows. In that embodiment, one or more flow smoothing screens 10 are situated upstream of a discharge cavity 11 through which the gas lasing medium flows at high velocity in the direction indicated by the arrow. The flow smoothing screens provide a temporally and spatially homogeneous, steady gas flow field that enables the laser to operate in the glow discharge mode at conditions that would otherwise cause arcing in the electric discharge of the gas in the discharge cavity. The discharge cavity has a rectangular cross-sectional shape and, as indicated in FIG. 1, electrodes may protrude from the walls in the discharge region. The hot gas exiting from the discharge cavity flows to a heat exchanger 12 where the gas delivers up much of its heat to restore the population inversions of the gas molecules to an appropriate level.

The cooled gas then flows to a blower 13 that circulates the gas through another heat exchanger 14 that further cools the gas. The heat exchanger 14 can be of the flat plate type and is designated the "upstream" heat exchanger to distinguish it from the downstream heat exchanger 12. After passing through the upstream heat exchanger and the flow smoothing screens 10, the gas enters the discharge cavity 11. The glow discharge occurs in a lasing region within the discharge cavity and, as indicated by the arrow in FIG. 2, the laser beam formed by multiple reflections between the laser optical cavity mirrors 16A and 16B then exits through a window 17 in the housing 18. Operation of the laser without the flow smoothing screens confirmed that the gas flow leaving the upstream heat exchanger contained small scale turbulence that impaired the ability of the laser to provide high output power and reduced the amount of electric power which could be supplied to the discharge without arcing.

FIG. 3 is a graph showing a correlation of the normalized velocity fluctuation U' (normalized by the mean flow velocity U) in a gas stream compared with the corresponding conditions upstream of a flow smoothing screen 30, the correlation being made against the screen pressure drop coefficient K, where K is the screen static pressure drop P divided by the flow field dynamic pressure $\frac{1}{2}\rho U^2$ upstream of the screen. The plots in FIG. 3 are of data reported by a number of investigators on the dampening of velocity nonuniformities in a flowing gas by a screen having pressure drop coefficient K. Plots 1 and 5 are of data reported in "Handbuch der Experimentalphysik" by L. Prandtl, Leipzig, Germany, Vol. 4, part 2, p. 73 NACA Tech. Memorandum No. 726. Plots 2 and 7 are of data reported in "Aerodynamic Characteristics of Damping Screens," Schubauer G. B., Spanenberg W. G., & Klebanoff P.S., NACA Tech. Note 2001, January 1950. Plots 3 and 6 are of data reported in "The Effect of Wire Gauze on Small Distrubances in a Uniform Stream," Quart. Journal Mech. and Appl. Math., Vol. II, pt. 1, pp. 1–29, March 1949. Plot 4 is of data reported in "The Use of Damping Screens for the Reduction of Wind-Tunnel Turbulence," Journal Aero Sci., Vol. 14, No. 4 pp. 221-228, April 1947. Plot 8 is of data reported in "The Design of Low-Speed Wind Tunnels," Prog. in Aeronautical Science, Kucheman D., and Sterne L., Vol. 5, p. 12 MaxMillan 1964.

Figure 4:
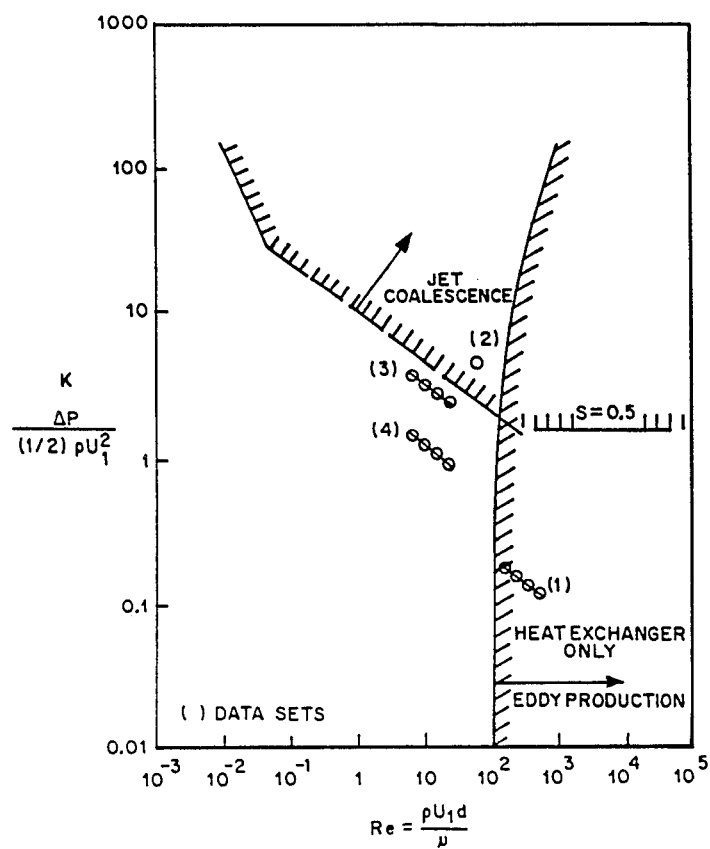
FIG. 4 is a graph showing allowable regimes for the damping of turbulence in the FIG. 1 embodiment by flow smoothing screens.

The design of a screen to produce an appropriate K value is critical if the production of a spatially and temporally smooth glow discharge in a flowing gas laser is to be accomplished without degrading other of the previously mentioned desirable flow field properties. FIG. 4 is a graph showing the K values produced by screens at various Reynold's numbers and solidity values S. The Reynold's number is given by $\rho U d/\mu$ where $\rho$ is the local gas density, U is the upstream velocity, d is the diameter of the screen wire, and $\mu$ is the viscosity of the gas. The solidity value S is the ratio of the blockage area of the screen wires to the total area of the screen, i.e. blockage area/total area.

As is known, a cylinder moving transversely through a gas and producing a Reynold's number $(\rho U d/\mu)$ larger than a certain value will shed a turbulent wake. It is important to the correct design of screens for use in the invention that the screen Reynold's number $(\rho U d/\mu)$ be less than this critical number to avoid the production of turbulence by wakes shed by the wires of the screen. It is also deemed important that a critical value of screen solidity S not be exceeded lest cooperative effects between the individual "jets" emanating from the individual holes formed by the matrix of screen wires produce "effective" Reynold's numbers so large as to cause turbulence downstream of the screen. Such turbulence takes long distances to decay because of the effectively larger lateral dimensions of the "jets" caused by the cooperative effects. Consequently, an important consideration in the design of flow smoothing screens to be used in the invention is the attainment of an appropriate individual screen K value wih a screen Reynold's number and solidity ratio below the critical values.

The FIG. 4 graph, for example, plots experimental points and shows that for screens producing Reynold's numbers Re of about $10^2$ or above, turbulence was produced. That graph also shows a plot of solidity values S. The data for an 8×8 mesh screen, indicated at (2) lies in the region where turbulence from jet coalescence occurs. The data set for a 16×16 mesh screen, indicated at (3), and the data set for a 24×24 mesh screen, indicated at (4), lie in the region where jet coalescence does not occur and those screens, in experiments, were effective in smoothing turbulence. The data set indicated at (1) in FIG. 4 shows that with no flow smoothing screen in the flow path, the flow, after leaving the upstream heat exchanger was turbulent.

In many instances, the damping or smoothing needed by a flowing gas laser requires such a very low value of the damping factor D (i.e., $<<10^{-1}$ on FIG. 3), that it cannot be attained with a single screen. As can be seen from FIG. 3, in such instances the required $K>>1$. In those instances, a serial array of screens is placed in the gas flow path such that the product of the damping factors $D_1, D_2, D_3, \ldots$ of the individual screens provides the required total damping factor, i.e. $D_1 \times D_2 \times D_3 \ldots D_i = D_{Total}$. The interval between successive screens in the series must be properly chosen so that the dynamics of the damping process is allowed enough space to enable each screen to meet its allotted damping factor.

Figure 5:
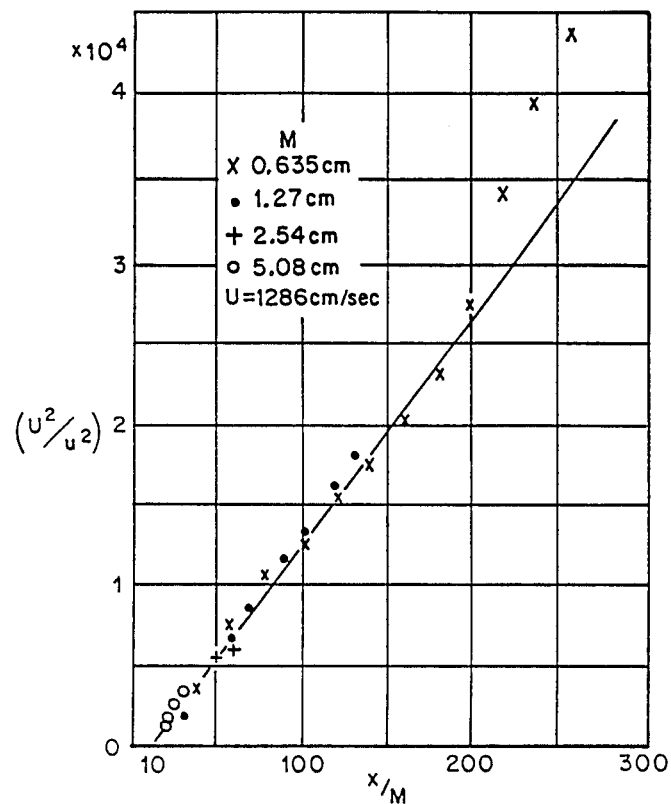
FIG. 5 is a graph showing the decay of energy during and beyond the initial period.

The plot shown in FIG. 5 is based on data from the following publications:

"Decay of Isotropic Turbulence in the Initial Period," Batchelor, G.K. and Townsend, A.A., Proceedings of the Royal Society.

The Decay of Turbulence Downstream of High Blockage Orifice Plates," Runyan, Larry J., University of Wash., Dept. of Aeron. & Astron.

The Strucutre of Turbulent Shear Flow," Townsend, A.A., Cambridge Univ. Press, 1956, P. 254.

"Decay of Anisotropic Turbulence," Tucker, Henry J. and Ali, S. Firasat, AIAA Journal, Vol. II, April 1973.

"Final Stage Decay of Grid-Produced Turbulence," Tan, H.S., and Ling, S.C., Physics of Fluids, Vol. 6, No. 12, December 1963.

In that plot, M is the distance (in centimeters) between holes in the screen measured from the center of one hole to the center of the next hole (or equivalently, the distance from one screen wire to the next).

It can be discerned from the FIG. 5 plot that the requisite distance to enable a screen in the array to produce its allotted damping factor D is related to the distance M between holes in the screen. The data indicates that for distances X between X=0 and X in the order of 10M downstream of the plane of the screen, no appreciable damping occurs. Beyond X≃10 M, turbulent damping begins and proceeds linearly to X≃100 M. That is $$D^2 \simeq \frac{1}{\frac{X}{M} - 10} \text{ for } 10\,M < x < 100\,M$$

That equation indicates the spacing X between successive screens, all of mesh size M and serially disposed one behind another in a sequential array, to produce the damping factor $D_i$ for *one* screen of the array, such that the total effect of the array of screens produces the required damping factor D.

The last screen in the array is closest to the discharge cavity and to be effective, must be placed a sufficient distance upstream of the lasing region to enable the requisite damping to occur downstream to produce the allotted damping factor. In the embodiment shown in FIG. 1, the screens are disposed upstream of the electric discharge region a distance that is adequate to provide the requisite spacing. The flow smoothing screens, preferably are placed where the flow velocity is relatively low and where small scale turbulence can be smoothed out before the gas is accelerated to the high velocity it attains in the lasing region. Of course, if only one flow smoothing screen is employed, it must also be placed a sufficient distance upstream of the lasing region to enable the requisite damping to occur before the gas stream reaches the lasing region.

Inasmuch as the invention can be embodied in various forms, it is not intended that the scope of the invention be limited only to the embodiments here described. It is, for example, obvious to the average person skilled in the flowing gas laser art that the invention can be applied to flowing gas lasers of types other than those of the transverse gas flow kind. It is also obvious to such a person that the placement of the flow smoothing screens will be governed in large measure by the type of flowing gas laser and the locations where small scale turbulence can most effectively be damped. The invention, obviously, is applicable to open cycle gas flow systems as well as to closed cycle systems. It is moreover, evident to the average person skilled in the science of aerodynamics as applied to flowing gas lasers that the screens in the array need not all be of one uniform mesh size so long as the requisite interval between successive screens is provided to enable each screen to meet its allotted damping coefficient. Because the invention can be embodied in a variety of different structures, it is intended that the scope of the invention be construed in accordance with the appended claims, having due regard for the substitution of obvious equivalents and other obvious changes that do not alter the essentials of the invention.

We claim:

1. In a flowing gas laser of the kind normally operating in the flow discharge mode and having a glow discharge region through which the gas flows with low turbulence while the glow discharge occurs, the improvement comprisng a flow smoothing screen disposed in the gas flow path upstream of the glow discharge region, the flow smoothing screen being of wire mesh and spaced from the beginning of the region by a distance not less than ten times the distance between the centers of adjacent holes of the screen said screen being disposed in the flow path at a loaction where said screen produces a Reynold's number that is below the critical value at which a turbulent wake is shed whereby the flow smoothing screen causes a lessening of the turbulence in the gas flow in the discharge region.

2. The improvement according the claim 1, wherein the solidity factor of the screen is below the value at which jets emanating from the holes in the screen coalesce downstream of the screen, when the solidity factor is the ratio of the blockage area of the screen wires to the total area of the screen.

3. In a flowing gas laser of the kind normally operating in the glow discharge made and having a glow discharge region through which the gas flow with low turbulence while the glow discharge occurs, the improvement comprising an array of flow smoothing screens disposed in series in the gas flow path upstream of the glow discharge region, each screen being of wire mesh and spaced from the next succeeding downstream screen in the array by an interval that is not less than ten times the space between the centers of adjacent holes of the upstream screen said screens being disposed in teh flow path at locations where said screens produce a Reynold's number that is below the critical value at which a turbulent wake is shed whereby the flow smoothing screens cause a lessening of the turbulence in the gas flow in the discharge region.

4. The impvorement according to claim 3, wherein the solidity factor of each screen of the array is below the value at which jets emanating from the holes in the stream cooperate to produce downstream turbulence, whereby the solidity factor is the ratio of the blockage area of the screen wires to the total area of the screen.

* * * * *